United States Patent [19]

Wheelock

[11] 4,102,989
[45] Jul. 25, 1978

[54] SIMULTANEOUS REDUCTIVE AND OXIDATIVE DECOMPOSITION OF CALCIUM SULFATE IN THE SAME FLUIDIZED BED

[75] Inventor: Thomas D. Wheelock, Ames, Iowa

[73] Assignee: Iowa State University Research Foundation, Inc., Ames, Iowa

[21] Appl. No.: 686,727

[22] Filed: May 17, 1976

Related U.S. Application Data

[63] Continuation-in-part of Ser. No. 470,053, May 15, 1974, abandoned, which is a continuation-in-part of Ser. No. 583,608, Jun. 4, 1975, abandoned.

[51] Int. Cl.$^2$ .................. C01B 17/50; C01B 13/14; C04B 11/02
[52] U.S. Cl. .................. 423/541 R; 423/168; 423/171; 423/638; 423/DIG. 16; 23/277 R
[58] Field of Search .............. 423/168, 170, 171, 172, 423/539, 541, 542, 530, 555, 635, 638; 23/277 R

[56] References Cited

U.S. PATENT DOCUMENTS

| | | | |
|---|---|---|---|
| 2,232,099 | 2/1941 | deJahn | 423/168 |
| 2,733,137 | 1/1956 | Swaine et al. | 423/542 |
| 2,825,628 | 3/1958 | Johannsen et al. | 423/542 |
| 2,993,778 | 7/1961 | Johannsen et al. | 423/542 |
| 3,198,602 | 8/1963 | Wittmann | 423/542 |
| 3,260,035 | 7/1966 | Wheelock et al. | 423/170 |
| 3,582,276 | 6/1971 | Campbell et al. | 423/539 |
| 3,607,045 | 9/1971 | Wheelock | 423/541 |
| 3,729,551 | 4/1973 | Gorin | 423/638 |

FOREIGN PATENT DOCUMENTS

| | | | |
|---|---|---|---|
| 590,975 | 1/1960 | United Kingdom | 423/541 |
| 643,479 | 9/1950 | United Kingdom | 423/541 |

OTHER PUBLICATIONS

Martin et al., "Decomposition of Gypsum in a Fluidized Bed Reactor," U.S. Bureau of Mines, Report of Investigations, 6286, 1963, 423, 541.
Environmental Protection Technology Series EPA 65012-74-001, Jan. 74 entitled, "A Regenerative Limestone Process for Fluidized Bed Coal Combustion and Resulfurization."

Primary Examiner—O. R. Vertiz
Assistant Examiner—Gary P. Straub
Attorney, Agent, or Firm—Tilton, Fallon, Lungmus & Chestnut

[57] ABSTRACT

Calcium sulfate is decomposed to CaO and $SO_2$ by high temperature treatment in a fluidized bed wherein reductive and oxidative conditions are simultaneously maintained. A highly reducing gas is formed in the lower portion of the bed from partial combustion of the fuel in admixture with the primary fluidizing air. The quantity of the primary fluidizing air is limited so that the reducing conditions in the lower zone converts the $CaSO_4$ to a mixture of CaO and CaS. Secondary air is introduced at a higher level in the bed to create an oxidizing zone in the upper portion of the bed above the reducing zone capable of converting CaS to CaO. The concurrent use of such reducing and oxidizing zones permits reducing conditions to be maintained which favor a high rate of decomposition even though these conditions favor the formation of CaS as well as CaO. The undesirable CaS, which would otherwise be discharged with the CaO product is eliminated by circulation of the fluidized particles through the oxidizing zone. Further, the heat of the exothermic reactions is conserved and utilized for promoting the endothermic reactions, both types of reactions occuring simultaneously while the rapid fluidized circulation of solids maintains a relatively uniform temperature throughout the bed.

8 Claims, 3 Drawing Figures

SIMULTANEOUS REDUCTIVE AND OXIDATIVE DECOMPOSITION OF CALCIUM SULFATE IN THE SAME FLUIDIZED BED

CROSS-REFERENCES

This application is a continuation-in-part of my co-pending application, Ser. No. 470,053, filed May 15, 1974, now abandoned and is also a continuation-in-part of my related co-pending application, Ser. No. 583,608, filed June 4, 1975, now abandoned.

BACKGROUND AND SUMMARY

In Wheelock and Boylan U.S. Pat. No. 3,087,790 there is disclosed a process for reductive decomposition of calcium sulfate which can produce a calcium oxide product substantially free of calcium sulfide together with recoverable sulfur dioxide. To minimize contamination of the CaO product with CaS, it is necessary to control the temperature of the reaction within narrow limits, namely within the range from 2150° to 2250° F., and to control the quantity of reducing gas (CO and $H_2$) to about 1 to 7% of the gaseous atmosphere, the $CO_2$ in the gaseous atmosphere being present in an amount greater than the combined amounts of the reducing gas and $SO_2$. When the process is operated on a continuous basis, therefore, the rate of the reduction reaction is limited, which in turn limits the through-put rate of the calcium sulfate. As disclosed in the later Wheelock and Boylan U.S. Pat. No. 3,607,045, the reductive decomposition may be carried out in a single fluidized bed with the reducing gas produced in situ by partial combustion of a hydrocarbon gas within the fluidized bed. This arrangement permits the air and fuel gas to be preheated by indirect heat exchange contact with the off-gas from the reactor, and the calcium sulfate feed can also be preheated by direct heat exchange contact with the off-gas. Substantial fuel and heat economies result, but it is sill necessary to carefully control the temperature and the CO and $H_2$ content of the reducing gas. U.S. Pat. No. 3,607,045 specifies the use of an amount of air providing from about 1.3 to 1.8 moles of $O_2$ per mole of C in the fuel gas. Reaction rates and through-put rates are therefore limited.

The equations representing the reactions involved in reductive decomposition of $CaSO_4$ by CO and $H_2$ are:

$$CaSO_4 + CO \rightarrow CaO + CO_2 + SO_2 \quad (1)$$

$$CaSO_4 + H_2 \rightarrow CaO + H_2O + SO_2 \quad (2)$$

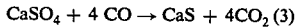
$$CaSO_4 + 4 CO \rightarrow CaS + 4CO_2 \quad (3)$$

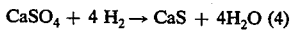
$$CaSO_4 + 4 H_2 \rightarrow CaS + 4H_2O \quad (4)$$

In general, the desired product reactions of equations (1) and (2) are preferentially favored over reactions (3) and (4) by mildly reducing conditions. The undesired reactions of equations (3) and (4) are promoted by more highly reducing conditions. However, it is apparent that the rate of all of the reactions can be increased by increasing the concentration of the reducing gas (CO and/or $H_2$), the driving force of the decomposition reactions being generally proportional to the concentration of the reducing agents. But if the gas phase is strongly reducing, calcium sulfide will be produced in objectional amounts and if the gas phase is weakly reducing, the rate of desulfurization will be undesirably slow.

From the standpoint of minimizing investment capital in relation to production capacity, it would be desirable to use as large concentrations of the reducing agents as possible. On the other hand, a high quality lime (CaO) product should be as free as possible from CaS. Further, where the product is incompletely desulfurized, either because of the presence of $CaSO_4$ or CaS, the recoverable $SO_2$ is reduced. The improved process of the present invention provides a greatly improved means for accomplishing these conflicting objectives.

A related problem is a tendency of the calcium sulfate feed to sinter during the high temperature treatment required for the reductive conversion. With natural calcium sulfate ores, such as gypsum and anhydrite, which are relatively pure gypsum or anhydrite, sintering can be largely avoided by maintaining temperatures below 2250° F. However, calcium sulfate wastes from various manufacturing operations and industrial pollution control systems have a greater tendency to sinter because of the presence of other ingredients which reduce the sintering temperature of calcium sulfate. Consequently, objectionable sintering may occur within the temperature range of 2150° to 2250° F., which heretofore has been believed to be the optimum temperature for converting calcium sulfate to calcium oxide with minimized formation of calcium sulfide.

Prior to the present invention, the state of the art indicated that temperatures below 2150° F. would cause incomplete desulfurization and formation of calcium sulfide. With the improved process of the present invention, however, lower temperatures than 2150° F. can be used without objectionable contamination of the lime product with CaS. Further, the lower temperatures permit the conversion of calcium sulfate wastes which otherwise would be subject to sintering.

Calcium sulfide can be removed from calcium oxide by a high temperature oxidizing roast. For example, as disclosed in Campbell et al U.S. Pat. No. 3,582,276, after calcium sulfate is treated with a reducing gas, calcium sulfide in admixture with calcium oxide can be treated with air or other oxygen-containing gas to convert the CaS to CaO and $SO_2$. The equation can be represented as follows:

$$CaS + 3/2\ O_2 \rightarrow CaO + SO_2 \quad (5)$$

However, calcium sulfide can oxidize to calcium sulfate by the following reaction:

$$CaS + 2\ O_2 \rightarrow CaSO_4 \quad (6)$$

While the reaction of equation 6 eliminates the undesirable CaS, the reformation of $CaSO_4$ results in incomplete desulfurization of the product with decreased production of the $SO_2$ by-product.

In the early 1950's, experiments relating to the reductive decomposition of calcium sulfate were conducted by Walter M. Bollen, as a graduate student in the Department of Chemical Engineering, at Iowa State College, Ames, Iowa. The results of these studies are reported in Bollen's Ph.D. Thesis, "Thermal Decomposition of Calcium Sulfate" (1954). These experiments were carried out in a batch-type fluidized bed reactor, which was supplied with the products of combustion of burning natural gas and air in a combustion chamber located outside of the fluidized bed. Bollen experimented with oxidation treatments to remove CaS from the CaO product, as reported in his above cited 1954 thesis, including the use of subsequent oxidizing roasts for reducing CaS in a CaO product. A similar post-treatment procedure is disclosed in the U.S. Patent of Campbell et al, No. 3,582,276. More specifically, at the conclusion of the reductive decomposition, Bollen either increased the ratio of air to gas much above the theoretical amount for complete combustion of the fuel gas, or the fuel gas was turned off entirely and only air was supplied to the fluidized bed. In either case, the result was a subsequent or last stage oxidizing treatment of the batch of CaO product to remove contaminating CaS.

Bollen also concluded that the CaS content of the CaO product could be reduced by decomposing the calcium sulfate at his recommended temperature of about 2350° F. with an air-gas ratio representing substantially 100% stoichiometric air for complete combustion as determined without reference to the $CaSO_4$ decomposition. Theoretically under this condition, the fluidizing preformed combustion gas entering the bed should contain no reducing gases (CO and/or $H_2$). However, Bollen's data appears to indicate that under the condition assumed to be 100% stoichiometric air for complete precombustion, traces of both $O_2$ and CO were present; analysis of the combustion gas as introduced showing amounts of carbon monoxide and oxygen, such as 0.5% CO and 0.7% $O_2$. At 95% precombustion stoichiometric air, the gas analysis showed no oxygen and more carbon monoxide (viz. 2.6% CO; 0.0% $O_2$). However, at 105% precombustion stoichiometric air, the gas analysis showed no carbon monoxide and more oxygen (viz. 0.0% CO; 1.4% $O_2$). This data is difficult to interpret.

Bollen hypothesized that at 100% precombustion stoichiometric air, alternating reducing and oxidizing conditions may have been obtained in the reactor. His observations overlook the $O_2$ formed by $CaSO_4$ decomposition, which would provide a total excess of $O_2$. Moreover, since the driving force of the reaction of carbon monoxide with oxygen to produce carbon dioxide is exceedingly large at the temperatures employed in Bollen's reactor, if both reducing and oxidizing conditions occurred, a more likely explanation is that the relative proportions of fuel gas and air fluctuated. With slight variations from 100% theoretical precombustion stoichiometric air over gas sampling intervals of several minutes, the collected gas sample might possibly contain small amounts of both carbon monoxide and oxygen, the sample, in effect, being an average of the slightly varying gas conditions in the reactor over a finite period of time. Whatever the theoretical explanation, it is apparent that Bollen's optimum conditions are not feasible for commercial decomposition of calcium sulfate. Even assuming that both carbon monoxide and oxygen can be present when the reactor is supplied with a gas-air combustion gases the amount of CO (and/or $H_2$) would be too small for effective reductive conversion of calcium sulfate to calcium oxide; that is, the reaction rate would be too slow for commercial use. Further, desulfurization would be incomplete in reasonable reaction times, and it would be expected that the by-product $SO_2$ would be produced in low yields at dilutions, which would make recovery impractical on a commercial basis.

The U.S. Patents of Robinson et al, Nos. 3,717,700 and 3,763,830 related to a process and apparatus for burning sulfur-containing fuels such as powdered coal. A fluidized bed of lime (CaO) is utilized to capture $SO_2$ released from the burning coal. The lime is thereby converted to calcium sulfate, which is decomposed to lime for process reuse in a separate fluidized bed regenerator. In the lime regenerator, air is introduced into the bottom of the bed as the fluidizing gas. The powdered coal is pneumatically conveyed with air into the lower portion of the regenerator. The powdered coal provides the fuel for the regeneration. In operation, the air flow is controlled to produce an overall excess of oxygen, the off-gas from the regenerator containing from about 0.5 to 2.5% oxygen.

By the improved process of the present invention, calcium sulfate can be decomposed at a greatly accelerated rate under highly reducing conditions, without paying the price of objectionable calcium sulfide contamination of the final lime (CaO) product as discharged from the reactor. In the reductive decomposition reaction which occur in the lower portion of the bed where partial, limited in situ combustion of the fuel also takes place, the calcium sulfate is subjected to highly effective rapid rate reducing conditions. At the same time, although such strong reducing conditions favor the production of the undesirable calcium sulfide, the oxidizing conditions maintained in the upper portion of the bed expose the rapidly circulating particles to conditions converting CaS to CaO, while any reformed $CaSO_4$ is continuously circulated through the reducing zone. More complete desulfurization is thereby achieved, and the resulting product can be substantially free of both calcium sulfate and calcium sulfide. By having the oxidizing zone above the reducing zone, the off-gas by-product can contain recoverable $SO_2$ substantially free of sulfur vapor or reduced sulfur gases, such as $H_2S$, carbonyl sulfide, etc.

From the standpoint of heat conservation, the heat generated by the exothermic oxidation reactions of equations (5) and (6), as they occur in the oxidation zone, can contribute to the total heat required for the endothermic decomposition reactions of equations (1) and (2). In the reducing zone, reactions (3) and (4) are exothermic. However, the process does not depend on these reactions to supply the energy for reactions (1) and (2). Because of the continuous circulation of material within the fluidized bed reactor, the occurrence of exothermic reactions in another portion of the bed, does not lead to undue fluctuations in the bed temperature. On the contrary, the temperature throughout the fluidized bed can be controlled to relatively stable temperature, which favors the desired reactions and avoids sintering.

THE DRAWINGS

The accompanying drawings comprise diagrammatic illustrations of three embodiments of the improved process of the present invention, FIGS. 1 to 3 being cross-sectional elevational view of fluidized bed reactors equipped with means for concurrently maintaining oxidizing and reducing zones within the same fluidized bed.

In the following detailed description, the illustrations of FIGS. 1 to 3 will be explained.

DETAILED DESCRIPTION

Figure 1:
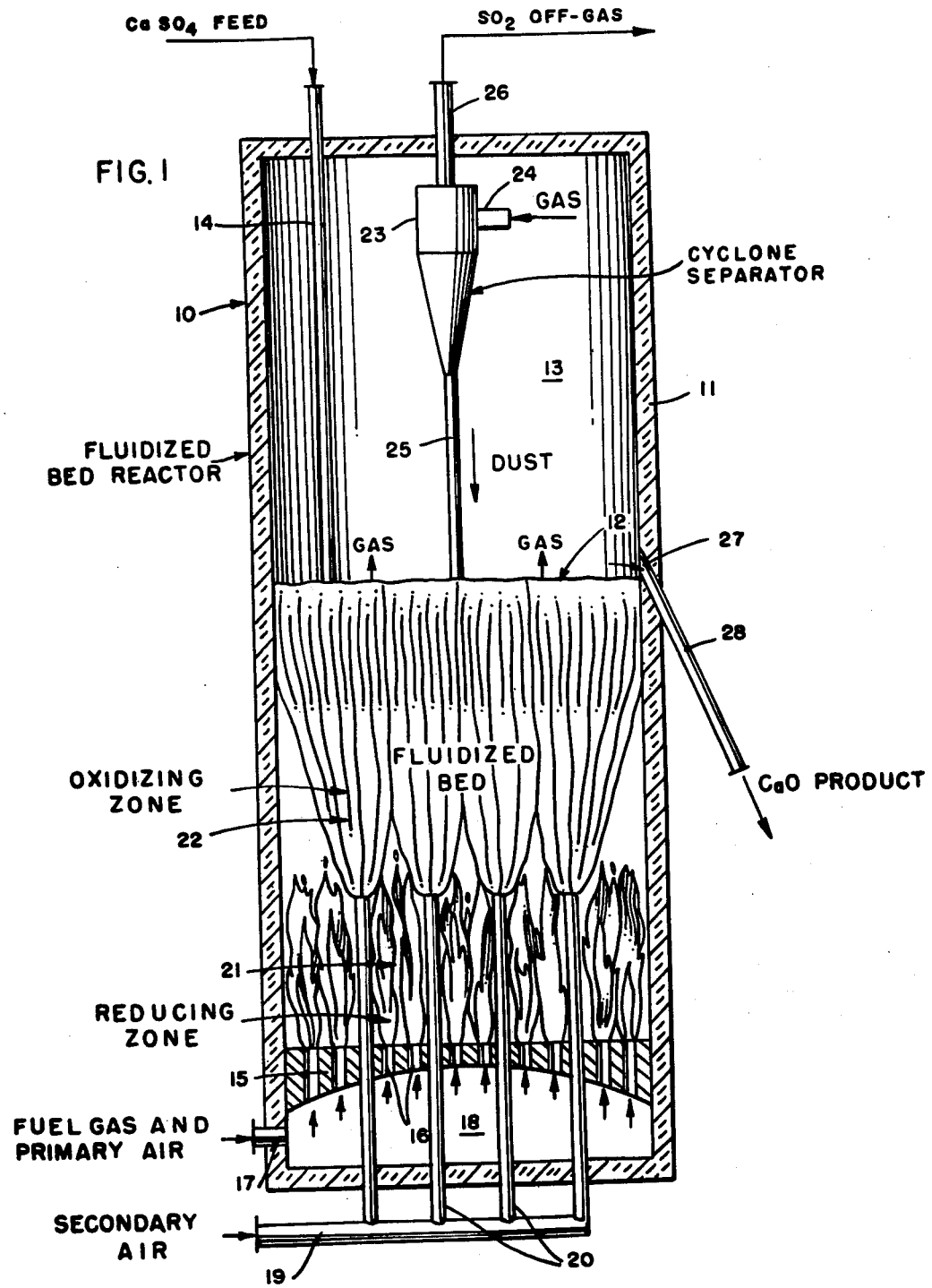

Since the present invention represents an improvement on the processes described in prior U.S. Pat. Nos. 3,087,790 and 3,607,045, the disclosures of these patents are incorporated herein by reference. Neither these patents nor any other prior art relating to fluidized bed processes, as far as applicant is aware, suggest that reduction and oxidation reactions can be simultaneously carried out in the same bed.

In practicing the present invention, the feed to the fluidized bed reactor is preferably a calcium sulfate anhydrite mineral. The principal component of such minerals is anhydrous calcium sulfate, although this is usually present in admixture with a minor proportion of gypsum, which is hydrated calcium sulfate ($CaSO_4 \cdot 2H_2O$). A gypsum mineral ore can also be utilized, or a gypsum mineral ore mixed with an anhydrite mineral. Industrial waste materials composed mainly of calcium sulfate can also be utilized.

As used herein, unless otherwise designated, the term "calcium sulfate" is intended to refer to both anhydrous and hydrated calcium sulfate. Unless the calcium sulfate is already in a state of fine subdivision, it is prepared for use in the process by crushing, grinding, and screening to produce a finely-divided feed of relatively uniform mesh size, such as −6 to +65 mesh (Tyler Standard Screen).

In one embodiment, the feed to the reactor is the sulfated lime produced by utilizing lime to capture the sulfur dioxide produced in the fluidized bed combustion of sulfur-containing coals. As indicated above, such fluidized bed combustion of sulfur-containing coal is described in U.S. Pat. Nos. 3,717,700 and 3,763,830. The feed to the regenerator reactor will therefore consist primarily of a mixture of anhydrous calcium sulfate and unreacted calcium oxide in a fine state of subdivision. Magnesium oxide may also be present if dolomitic lime has been used in the fluidized bed combustion.

The finely divided calcium sulfate feed is supplied to a fluidized bed reactor, providing a single reaction bed within which the solid particles freely circulate. Where the desired capacity cannot be provided by a single reactor, a plurality of separate fluidized bed reactors can be used, each reactor being supplied with the calcium sulfate feed and each reactor producing the final calcium oxide product.

It will be understood that the reactor beds will be designed in accordance with well-known principles so that the bed of finely-divided calcium sulfate is capable of being fluidized by a fluidizing gas mixture. The fuel for in situ combustion produces the reducing gas (CO and/or $H_2$). Carbonaceous fuels usable for such purpose, as is known in the art, include gaseous and liquid hydrocarbon fuels (viz. natural gas or petroleum oil) and solid carbon fuels (viz. powdered coal). The fuel when partially burned should produce a reducing gas containing at least CO and preferably both CO and $H_2$. Hydrogen-containing carbonaceous fuels are therefore preferred. Effective control of the reducing zone conditions can be readily achieved by using a hydrocarbon gas, such as natural gas. However, a liquid hydrocarbon fuel can be used. In either case, precombustion is not desirable. Consequently, where the extent of preheating of a hydrocarbon gas or the air is such that on mixing, precombustion may occur outside of the reactor, the air and gas are preferably separately supplied on the reducing zone of the reactor. The hydrocarbon gas or liquid fuel and air mix and burn on being introduced to the fluidized bed, forming in situ a reducing gas containing CO and $H_2$ as the reducing agents. Since coal contains volatiles, it will also form both $H_2$ and CO on partial combustion. The coal may also be supplemented with a hydrocarbon gas. A preferred procedure for using high volatile coal as the fuel will be described subsequently.

In accordance with the present invention, the air flows are carefully controlled. The proportion of air to fuel introduced into the lower reducing zone portions should be such that substantially less $O_2$ is available in the reducing zone for complete combustion of the fuel. According to equations (1) to (4), this results in the conversion of $CaSO_4$ to a mixture of CaO and CaS.

The air fed to the lower reducing zones is referred to herein as the "primary" air, while the air fed to the upper oxidizing zones is called the "secondary" air. For hydrocarbon fuels, such as natural gas or petroleum oil, the proportion of the primary fluidizing air to the fuel fed to the reducing zone portion can range from about 20 to 90%, such as 30 to 70%, of the stoichiometric quantity of air (on a $O_2$ basis) required for complete combustion of the fuel to $CO_2$ and $H_2O$. Preferably, however, at least 40% of stoichiometric air is used for the initial admixture with the fuel. In general, the most desirable operating range in the lower reducing zones for hydrocarbon fuels is believed to be within the range from about 40 to 65% of the air required for complete combustion of the fuel to $CO_2$ and $H_2O$.

To maintain an oxidizing zone in the upper portions of the bed capable of converting CaS to CaO, excess oxygen is sustained therein by feeding secondary air to the oxidizing zone of the fluidized bed at a controlled rate. At the point of introduction of the air, strongly oxidizing conditions can be obtained, and at least mildly oxidizing conditions can be maintained over a zone of sufficient size to oxidize calcium sulfide particles as they circulate through the upper portion of the fluidized bed. When the oxidation results in the reformation of calcium sulfate particles, such particles will be recirculated into and through the reducing zone, thereby decomposing and reformed calcium sulfate to the desired calcium oxide. With gas or liquid hydrocaron fuels, the quantity of secondary air can range from as little as 10% up to as much as 60% of the total air (primary and secondary). The secondary or oxidizing air flow will usually be a lesser volume than the primary air flow. For example, the secondary air may range from 15 to 40% of the total air introduced.

In operating the process to sustain fluidization it is necessary to remove the fluidizing gas from the top of the bed, and for convenience of operation it is preferable to remove the lime product from the upper portion of the bed. This arrangement works out well with the reducing zone or zones, in the lower portion of the bed, and the oxidizing zone or zones above the reducing zones, in accordance with present invention. The reaction products are thus discharged from the oxidizing zone as they leave the reactor, which increases the likelihood that they will be in an oxidized state when they exit. Moreover, the off-gas can contain $SO_2$ substantially free of S, $H_2S$, etc.

The primary fluidizing gas is the air, or the mixture of air and fuel gas, introduced into the bottom of the reactor. This fluidizing gas flows upwardly through the bed, and is removed from the gas space above the bed. The CaO product is preferably removed from an upper portion of the bed beneath which air is fed to the oxidizing zone. The upper boundaries of the oxidizing zone do not need to be precisely established or maintained. However, the product is preferably removed from an upper portion of the bed in which essentially oxidizing conditions exist. It is convenient to remove the CaO product from the uppermost portion of the bed. The fluidizing gas at that level can be essentially neutral with respect to reducing potential, containing essentially no CO or $H_2$. Some excess oxygen, however, may be present, such as 0.5 to 2% $O_2$ in the off-gas on a molar basis.

The decomposition of calcium sulfate produces oxygen which is available to combine with the carbon and hydrogen of the fuel, one-half mole of oxygen ($O_2$) being produced for each mole of calcium sulfate decomposed. In general, for optimum thermal and material efficiencies, the total amount of air supplied to the reactor, including the air supplied to both the reducing and oxidizing zones thereof, should be equal to the stoichiometric quantity of air (on an $O_2$ basis) required for complete combustion of the fuel to $CO_2$ and $H_2O$ less the amount of air equivalent ($O_2$) supplied by the decomposition of calcium sulfate. Although some additional air above this optimum value, as indicated above, may be supplied to insure complete combustion of the fuel and to provide a slightly oxidizing off-gas, large excesses of air result in corresponding losses in thermal and material efficiencies. The off-gas can be analyzed periodically or continuously in monitoring the process. Advantageously, the off-gas is substantially free of CO, $H_2$, and unburned fuel, containing $N_2$, $CO_2$, $H_2O$, $SO_2$, and a small percent of $O_2$.

Since the total quantities of both fuel and air required for optimum thermal and material efficiencies can be determined by applying well-known material and energy balance calculations, no claim of novelty or invention is made with respect thereto. For any given fuel, $CaSO_4$ feed rate, and bed temperature, the optimized total air required for the fuel combustion can also be determined experimentally. This has been done previously. The benefits of the present invention are achieved by splitting the total flow of air to the reactor into primary and secondary flows which are fed respectively to reducing and oxidizing zones, as described above, and which are apportioned relative to each other to maintain the oxidizing and reducing conditions.

The average temperatures to be maintained in the fluidized bed can be in accordance with the temperature specified in prior U.S. Pat. Nos. 3,087,790 and 3,607,045, that is, within the range from 2150° to 2250° F. Temperatures above 2250° F. are not desirable. However, one of the advantages of the process improvement of the present invention is that lower temperatures can be employed than 2150° F. For example, where the use of lower temperatures is desirable, as where the feed has a tendency to sinter at temperatures in the range of 2150° to 2250° F., the temperature can be reduced below 2150° F. Consequently, where a sintering problem is encountered with the feed, it may be desirable to operate at a temperature in the range of about 1950° to 2125° F. Such lower temperatures will also reduce the quantity of fuel required. Therefore, the temperature condition of the reactor bed when employing the feature of the present invention is from about 1950° to 2250° F.

Referring to the diagrammatic view of FIG. 1, the fluidized bed reactor 10 comprises a vessel having a heat-insulating jacket 11. In the lower portion of the reactor there is provided a fluidized bed designated generally by the number 12 and in the upper portion a gas space 13. As shown, the $CaSO_4$ feed is supplied through the top of the reactor by means of a feed pipe or conduit 14, which extends downwardly to approximately the top of the bed 12. The fluidized bed 12 is supported on a gas distributor plate 15, which is provided with a plurality of upwardly extending inlet passages 16. These passages are distributed in all directions across the plate 15, and are arranged to provide for uniformity of gas inlet flow across the bed. As shown, a common fuel gas and primary air inlet 17 is provided in the lower portion of the reactor communicating with the gas space 18 below the distributor 15.

As previously indicated, where the fuel gas, such as natural gas, and/or combustion air are preheated to temperatures which on mixing will tend to produce immediate combustion, separate inlets may be provided for the fuel gas and primary air. In the arrangement shown, these separate inlets can communicate with the vapor space 18, or the primary air alone can be supplied through the inlet 17, and pipe means provided for supplying gas to nozzles or jets supported in the plate 15. With any of these arrangements, the fuel gas and primary air will enter the lower portion of the fluidized bed 12 together, causing the fuel to be partially burned in the lower portion of the bed, and thereby producing reducing quantities of carbon monoxide and hydrogen.

Additional air, referred to in FIG. 1 as secondary air is also supplied to a portion of the bed location at a higher level than that at which the fuel gas and primary air are introduced. As shown, the secondary air is introduced through a manifold pipe 19 which communicates with the distributor pipes 20 that extend upwardly through plate 15 to an intermediate level within the fluidized bed 12. With this arrangement, as indicated by the labels on FIG. 1, a reducing zone 21 is provided in the lower portion of the bed, and an oxidizing zone 22 in a portion of the bed above the reducing zone. Strongly reducing conditions can thereby be maintained in the lower portion of bed 12, while oxidizing conditions are maintained in an upper portion thereof. Immediately adjacent to the outlets from pipes 20, a highly oxidizing condition will be present. As the reducing gases flow upwardly from the lower zone 21, and mix with the air introduced through pipes 20, the carbon monoxide and hydrogen, as well as any residual hydrocarbon, will be burned. The amount of CO and $H_2$ in relation to the amount of $O_2$ will gradually reduce. Thus, an oxidizing zone can be maintained above the reducing zone, while at the same time, the off-gas leaving the top of the bed 12 can be essentially neutral, but preferably is slightly oxidizing. Typically, the off-gas will be composed essentially of $N_2$, $H_2O$, $CO_2$ and $SO_2$, and will contain a small amount of $O_2$ (vix. 0.5–2.0 mole %), while being essentially free of CO, $H_2$, unburned fuel ($CH_4$, $C_2H_6$, etc.), and reduced forms of sulfur (S, $H_2S$, etc.).

Since fine solids (dust) may be entrained in the gas leaving the bed, the gas may be passed through a solids separator, such as a cyclone separator. As shown, a cyclone separator 23 is located within the upper portion of gas space 13. The off-gas enters the separator through a side inlet 24. The separated dust is returned to the fluidized bed through a downwardly extending pipe or conduit 25. The purified gas, containing the recoverable $SO_2$ is removed through a top outlet 26 which extends through the top wall of reactor 10. It will be understood that these features of equipment design may be varied, such as, for example, by locating the cyclone separator outside of the reactor.

Means are also provided for removing the CaO product from the upper portion of bed 12. As shown, a discharge outlet 27 is located on the opposite side of the reactor from the feed inlet 14. The outlet 27 is positioned at the top of the bed 12, and serves to control the upper level of the bed. The lime product is discharged through a pipe or conduit 28 extending downwardly and outwardly from outlet opening 27 through the adjacent side wall of the reactor.

The present invention may be better understood, both theoretically and in relation to practical commercial embodiments, by considering the following examples.

EXAMPLE I

Tests were conducted using a bench-scale reactor adapted to provide separate reducing and oxidizing zones in accordance with the principles of the present invention.

The reactor was constructed of refractory materials for the most part and had a steel shell to prevent leakage of gases to the atmosphere. The outer shell was insulated to reduce heat losses. When the reactor was in use, it contained fluidized, reacting solids up to the overflow pipe which passed through the side of the reactor. Primary air and natural gas were admitted through the bed support plate at the bottom of the reactor and secondary air through a ceramic tube which passed through the top of the reactor and was immersed in the fluidized bed, extending downwardly to an intermediate level. The bed support plate was covered by several layers of alumina pellets for protection. Finely divided solids were pneumatically conveyed into the reactor by the secondary air and reacted solids were removed through the overflow pipe. Gases were removed through an exhaust port near the top of the reactor. The fluidized bed temperature was determined with a chromel-alumel thermocouple placed in a mullite ceramic protection tube inserted in the bed.

Two reaction zones were achieved by limiting the ratio of primary air to natural gas so that the lower part of the fluidized bed was reducing in character and by introducing sufficient secondary air so that the upper part of the bed was oxidizing. Since the bench-scale reactor was not insulated sufficiently to avoid relatively large heat losses, either the primary or secondary air or both had to be enriched with oxygen to achieve the necessary operating temperatures. Such enrichment would not be necessary on an industrial scale where the reactor could be insulated more effectively.

Compressed air, oxygen and natural gas were metered individually and mixed before reaching the gas distributor at the bottom of the reactor. Additional compressed air and sometimes oxygen were metered and mixed before being supplied as secondary air. Finely divided solids were introduced at a controlled rate into the secondary air by a screw feeder and were then transported by the air into the reactor. The gas which issued from the top of the reactor was passed through cyclone separators and a bag filter to remove entrained solids and then through a condenser to condense water vapor. After separating the condensate, the gas was conducted to an ejector which vented to the atmosphere. The ejector was operated so that the gas pressure in the reactor was only slightly greater than atmospheric pressure. Samples of the product gas were collected from a point between the reactor and cyclone separator and were analyzed with a gas chromatograph.

Two natural ores of calcium sulfate which had been crushed and screened to −14 +35 mesh size were used for the test operation of the reactor. One of these ores were predominantly gypsum (G) whereas the other was predominantly anhydrite (A). The approximate chemical composition of the ores were:

| Ore Constituents | Gypsum | Anhydrite |
|---|---|---|
| | (Wt. % in Ore) | |
| Anhydrite (CaSO$_4$) | — | 73.4 |
| Gypsum (CaSO$_4$. 2H$_2$O) | 94.7 | 24.4 |
| Calcium and magnesium carbonates | 1.6 | 0.6 |
| Silica (SiO$_2$) | 3.3 | — |
| Sodium Chloride (NaCl) | 0.3 | — |
| Other constituents | 0.1 | 1.6 |
| | 100.0 | 100.0 |

Natural gas used for the heat operation had the following average composition as determined with a gas chromatograph:

| Constituents | Mole % |
|---|---|
| Methane (CH$_4$) | 88.2 |
| Ethane (C$_2$H$_6$) | 4.8 |
| Nitrogen (N$_2$) | 7.0 |
| | 100.0 |

Combustion tests were carried out to determine the effect of the air to natural gas ratio on the composition of the combustion products. These tests were made by burning natural gas and air mixtures in a two-inch diameter ceramic tube containing an inert alumina packing. Combustion took place at atmospheric pressure and at temperatures in excess of 2000° F. The combustion products were analyzed with a gas chromatograph after the water had been condensed out. Since the chromatograph was incapable of separating oxygen and argon, these two components, which are both present in air, were determined together. The results showed that with an air to natural gas ratio of 10, an essentially neutral mixture of combustion products was obtained; lower ratios provided reducing gas mixtures containing free hydrogen and carbon monoxide and higher ratios provided oxidizing mixtures containing free oxygen. Moreover, as the ratio decreased below 10, the concentrations of reducing agents increased.

A number of test runs were made in which the two-zone reactor was used to continuously decompose natural ores of calcium sulfate. During the tests, the depth of the fluidized bed was maintained at approximately 9 to 10 inches in the 4.75-inch I.D. reactor. The feed, comprising the gypsum or anhydrite, was sized to between −14 and +35 mesh (Tyler Standard Screen). Each of the runs was continued for several hours so as to achieve essentially steady-state conditions in which the solids feed and overflow rates, gas flow rates, product gas composition, and fluidized bed temperature were nearly constant. Various system parameters were changed from run to run so as to determine their effects on desulfurization of the solids and product gas composition.

Operating conditions used for these runs are presented below in Table A, and the results obtained are presented in Table B. Only key items are included. Thus, only the concentrations of oxygen and sulfur dioxide in the reactor off-gas are given and product solids are characterized only by percent desulfurization and calcium sulfide content. The ratio of the total flow of air to gas is not tabulated, since it is the sum of primary and secondary flow ratios, which are tabulated.

TABLE A

| Run No. | Ore[a] Feed | Feed Rate (g./min.) | Natural Gas Flow (s.c.f.m.) | Air + O$_2$ Flow (s.c.f.m.) | Primary Air[b] Gas | Secondary Air[b] Gas | Sec.Air Pri.Air | Nominal Bed Temp. (° F.) | Holdup Time (min.) |
|---|---|---|---|---|---|---|---|---|---|
| 1 | G | 25 | 0.52 | 2.38 | 5.0 | 3.5 | 0.70 | 2120 | 186 |
| 2 | G | 50 | 0.67 | 3.24 | 5.0 | 3.5 | 0.70 | 1960 | 91 |
| 3 | A | 40 | 0.67 | 3.31 | 5.0 | 3.7 | 0.74 | 2230 | 29 |
| 4 | A | 33 | 0.60 | 2.86 | 5.0 | 3.9 | 0.78 | 2230 | 23 |
| 5 | A | 33 | 0.60 | 3.14 | 5.0 | 5.0 | 1.00 | 2130 | 75 |
| 6 | A | 45 | 0.54 | 2.81 | 5.0 | 5.4 | 1.08 | 2000 | 66 |
| 7 | A | 42 | 0.51 | 2.86 | 5.1 | 5.5 | 1.08 | 1910 | 119 |
| 8 | A | 39 | 0.54 | 2.81 | 5.0 | 5.7 | 1.14 | 2170 | 74 |
| 9 | A | 31 | 0.56 | 3.08 | 5.4 | 5.3 | 0.98 | 2210 | 118 |
| 10 | G | 32 | 0.64 | 3.20 | 4.2 | 5.8 | 1.38 | 2170 | 63 |
| 11 | A | 37 | 0.61 | 2.81 | 4.4 | 5.1 | 1.16 | 2100 | 118 |
| 12 | A | 37 | 0.61 | 2.81 | 4.4 | 5.1 | 1.16 | 2200 | 79 |

[a]G = Gypsum; A = Anhydrite
[b]Equivalent amount of air to natural gas ratio.

TABLE B

| Run No. | Off-Gas Composition[c] % O$_2$ | % SO$_2$ | Product Solids % CaS | % Desulf. | Entrained Fines % Prod. | % CaS | % Desulf. |
|---|---|---|---|---|---|---|---|
| 1 | — | 3.3 | 0.1 | 98.4 | 9 | 5.3 | 78 |
| 2 | — | 5.0 | 2.6 | 94.9 | 41 | 12.0 | 59 |
| 3 | — | 7.5 | 0.5 | 97.7 | 5 | 10.4 | 71 |
| 4 | — | 6.5 | 0 | 98.6 | 5 | 9.2 | 75 |
| 5 | 5.9 | 8.0 | 0.1 | 97.7 | 6 | 1.2 | 75 |
| 6 | 3.8 | 8.5 | 0 | 79.9 | 12 | 1.0 | 39 |
| 7 | 8.4 | 5.0 | 0.2 | 44.7 | 11 | 0.3 | 22 |
| 8 | 4.3 | 10.0 | 0.2 | 98.3 | 4 | 0.9 | 79 |
| 9 | 5.7 | 6.0 | 0.1 | 99.2 | 11 | 1.2 | 74 |
| 10 | 3.2 | 5.2 | 0.4 | 98.7 | 28 | 2.6 | 81 |
| 11 | 4.5 | 7.5 | 0.1 | 98.8 | 7 | 1.5 | 67 |
| 12 | 5.2 | 7.5 | 0.9 | 98.4 | 9 | 1.9 | 78 |

[c]Volume composition on a dry basis.

Since the ratio of primary air to natural gas was held in the range of 4.2 to 5.4, the gas in the lower part of the fluidized bed was always highly reducing. On the other hand, the gas in the region surrounding the diptube through which secondary air was introduced was oxidizing, ranging from strongly oxidizing at the point of air release to mildly oxidizing above and outward from that point. The relative size of the reducing and oxidizing zones depended upon the degree of submergence of the diptube and the overall air to natural gas ratio. For the first ten runs listed, the lower end of the diptube was 1.0 inch above the top layer of alumina pellets in the bottom of the reactor and for the last two runs 4.0 inches above. In order to determine the approximate relative size of the two regions, a gas sampling probe was inserted in the fluidized bed in place of the thermocouple well during portions of several runs. The sampling tube was moved up and down along a line parallel to the diptube and about 3 inches from it. Gas samples were collected at various points along this line and analyzed with a gas chromatograph. In the first of the two cases where the end of the diptube was close to the bottom of the fluidized bed, the reducing zone appeared to be relatively thin and the oxidizing zone extended laterally far enough to be intercepted by the sampling probe. In the second case, where the end of the diptube was higher, the reducing zone was thicker and the oxidizing zone did not extend outward far enough to be intercepted.

The average residence time of the solids in the reactor was estimated by dividing the weight of solids remaining in the reactor after a run was completed by the average overflow rate during steady-state operation. The residence time of the solids entrained in the gas passing through the reactor was not estimated, but it was probably less than that of the overflow product. However, only a small percentage of the solids was usually entrained in the gas. This can be seen from Table B where the quantity of entrained solids is listed as a percentage of the overflow product. Only in two runs (Nos. 2 and 10) did entrainment seem excessive and both of these runs were made with gypsum ore which tended to decrepitate in the reactor. In general, the entrained solids were not as well desulfurized as the overflow product and contained more calcium sulfide.

The results of Table B show in general that overflow product solids can be produced by the process which are well desulfurized and low in calcium sulfide contamination. Moreover, useful concentrations of sulfur dioxide in the reactor off-gas can be generally realized. Where the overall air to natural gas ratio was substantially below 10 (viz. 8.5 to 8.9 in runs 1 to 4), the calcium sulfide content of the entrained fires was substantially higher and some of the runs show an increase in CaS in the product solids. Sufficient total air to produce a neutral or slightly oxidizing off-gas is therefore desirable. Temperature variations do not appear to have much effect between 2100° and 2230° F. However, a comparison of the results obtained in Runs 6 and 7 with other runs at higher temperatures shows that the desulfurization fell off as the temperature was reduced to 2000° F. and then 1910° F. This indicated a decrease in reaction rate as the temperature dropped. Of significance, however, was the finding that the calcium sulfide content of the product solids did not increase noticeably at the lower temperatures, when using the process.

These findings demonstrated several important advantages of the two-zone fluidized bed process over single zone fluidized bed reductive decomposition. Firstly, a high degree of desulfurization or conversion can be obtained over a rather wide range of operating conditions. Secondly, the product solids will contain very little calcium sulfide. Thirdly, the process of decomposition can be carried out at lower temperatures without producing solids containing large concentrations of calcium sulfide.

EXAMPLE II

In a typical industrial application of the two-zone fluidized bed process of this invention, calcium sulfate particles can be decomposed continuously in a two-zone fluidized bed supplied with air and natural gas (or other fuel) and heated to 2200° F. At least part of the reactants can be preheated by heat exchange with the reactor off-gases as described in U.S. Pat. No. 3,607,045, and the reactor being well-insulated so that heat losses would be negligible. By recovering heat from the off-gases, the solids feed can be preheated to about 1600° F. and the air to 1400° F. Under these conditions, approximately 0.84 mole of methane equivalent will be required for each mole of calcium sulfate decomposed, and approximately 6.7 mole of air total/mole methane equivalent will be needed.

In general, the quantities of fuel and air required for decomposition of calcium sulfate can be estimated by simultaneous solution of the material and energy balances. For this purpose, it may be assumed that methane is used as the fuel, anhydrite for the feed, and the anhydrite is decomposed completely at a temperature of 2200° F. and atmospheric pressure, without the need of either excess air or excess reducing agents. It may also be assumed that heat losses are negligible. Under these idealized conditions, it is only necessary to consider the following overall reactions for the energy and material balance calculations, even though the actual process involves a number of reaction steps:

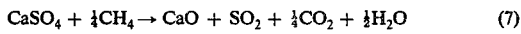

$$CaSO_4 + \tfrac{1}{4}CH_4 \rightarrow CaO + SO_2 + \tfrac{1}{4}CO_2 + \tfrac{1}{2}H_2O \quad (7)$$

$$CH_4 + 2O_2 \rightarrow CO_2 + 2H_2O \quad (8)$$

Reaction 7 accounts for the endothermic decomposition of calcium sulfate, while reaction 8 provides the necessary heat of reaction, as well as the heat required to raise the temperature of the reactants to that of the reactor. In other words, the actual quantities of methane and air consumed depend upon the temperature of the entering reactants. Preheating of the entering solids and gases is desirable. Further, given known methods of heat recovery, sufficient heat can be recovered from the off-gas to preheat the primary and secondary air to about 1400°–1500° F. The CaSO₄ feed may be preheated to about 1500°–1600° F. Such heat recovery and preheating methods are set out in prior U.S. Pat. No. 3,607,045. With such methods, the amount of fuel required is moderate, and the concentration of sulfur dioxide in the off-gas is adequate for conversion into sulfuric acid.

To achieve conditions advantageous for practicing the present invention, the following procedure may be used.

The natural gas and the preheated primary air are mixed and introduced at the bottom of the reactor so as to create a reducing zone in the lower part of the fluidized bed. From 40 to 65% of the stoichiometric air required for complete combustion of the gas is thereby introduced in the reducing zone. The preheated secondary air can be introduced through separate nozzles or tuyeres so as to create an oxidizing zone in the upper part of the fluidized bed. The solids are introduced either separately as by means of a screw conveyor or star valve or together with the secondary air. The size of the reactor can be chosen so as to provide about 1 to 2 hour average residence time for the reacting solids. The reacted solids are withdrawn through an overflow pipe. Solids entrained in the reactor off-gas can be recovered by a cyclone separator and returned to the fluidized bed for further treatment. The temperature of the fluidized bed is maintained at about 2200° F. Under these circumstances, the calcium sulfate will be almost completely decomposed, and the reactor off-gases will contain a relatively high percent of sulfur dioxide (e.g. 10–13%) and will be suitable for conversion into sulfuric acid after removal of dust and water vapor. Furthermore, the solids product should be chemically reactive lime (CaO) which is essentially free of calcium sulfide (less than 1% CaS) and calcium sulfate (less than 5% CaSO₄).

EXAMPLE III

Where the calcium sulfate feed shows a tendency to sinter at a temperature in the range of 2150° to 2250° F., such as a temperature of 2200° F., set out in Example II, the reactor may be operated at a lower temperature. For example, the fluidized bed may be maintained at a nominal temperature of about 2000° F. instead of the temperature of 2200° F. referred to in Example II. Since the rate of reaction will be slower at the lower temperature, the average residence time of the reacting solids must be increased correspondingly in order to obtain the same degree of conversion. Thus using a single stage fluidized bed reactor as in Example II, the size of the reactor can be chosen so as to provide about 7 to 15 hour average residence time for the solids. Under these circumstances, the composition and general character of the off-gases and product time will be similar to that obtained in Example II.

EXAMPLE IV

Figure 2:
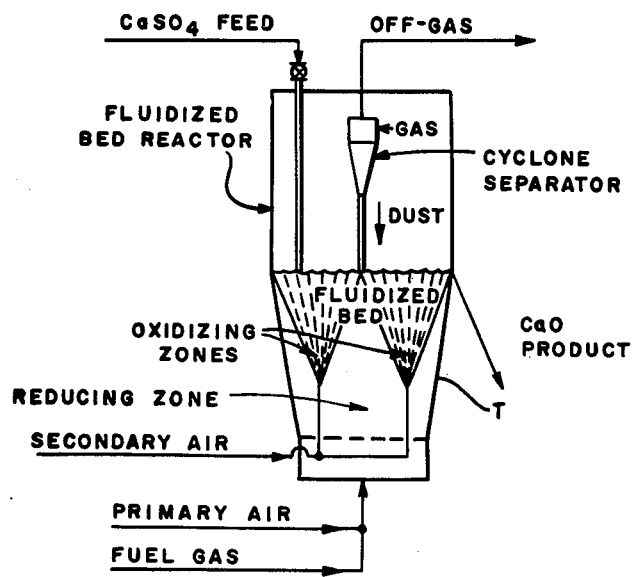

In FIG. 2, there is shown an apparatus similar to that of FIG. 1, except that the shape of the reactor walls containing the fluidized bed has been modified to more nearly equalize the gas velocity between the lower reducing zone and the upper oxidizing zone. The legends on FIG. 2 will serve to identify the corresponding components of the apparatus with respect to those described, for Example I. The portion of the reactor receiving the fluidized bed is designated by the letter T. As will be noted, the cross-sectional area of the fluidized bed enlarges in an upward direction. In the illustration given, the walls containing the fluidized bed have the shape of the section of a cone, that is, they have a frusto-conical configuration. However, the operational principle illustrated by FIG. 2 can be utilized with other cross-sectional shapes which provide an upper portion of the bed of enlarged cross-section as compared with the lower portion of the bed. Since the total gas flowing through the upper oxidizing portion of the bed is necessarily greater than that flowing through the lower or reducing portion of the bed, the gas velocity would necessarily be greater in the upper portion of the bed if the cross-section of the bed was the same in the reducing and oxidizing zones. However, by employing a fluidized bed which enlarges in cross-section in an upward direction, a more uniform gas velocity can be achieved. The fluidization can therefore be expected to be smoother, and there should be less particle attrition and entrainment of fines in the gas leaving the reactor. In addition, there will be more tendency for the denser, unreacted solids to concentrate in the lower portion of the fluidized bed, while the lighter, reacted solids will tend to concentrate in the upper portion of the fluidized bed. Such particle segregation, will help insure that the product, as removed from the top of the fluidized bed, will be fully reacted solids, and will contain a minimum amount of unreacted calcium sulfate.

Instead of reducing the cross-section of the lower portion of the reactor by tapering the outer walls of the reactor inwardly and downwardly, the lower reducing zone or zones can be provided within conical spaces of upwardly enlarging cross-section. To achieve this construction, a suitable refractory can be employed in the lower portion of the reactor, which may be in the form of refractory bricks, or other structural shapes, which can be installed to provide upwardly enlarging conical reducing zone spaces. In the area of the oxidizing zone, the bed can extend across the full width of the reactor, which at that level may have either a circular or rectangular cross-section. In general, all of the interior walls of the reactors, should be made of refractory materials to withstand the high temperatures and corrosive conditions. In particular, the innermost lining of the reactor, which is in contact with the fluidized bed, can advantageously be made of a hard, dense refractory, such as a high-alumina castable, which will be well adapted to withstand the erosive action of the bed. Surrounding the refractory lining, suitable high temperature insulation can be provided to minimize heat loss. For example, this insulation can be in the form of lightweight, insulating castable refractory. A similar type of refractory can also be used to line the top of the reactor. Advantageously, the entire reactor can be enclosed in a steel shell to provide gas-tightness and structural support. Such details of construction, however, are well-known in the art of operating fluidized beds, and therefore are not part of the present invention.

EXAMPLE V

In industrial practice the reactor would be insulated to minimize heat losses. However, the bench-scale reactor employed in the tests reported in Example I was not well insulated. Therefore larger heat losses were involved than would be desirable for commercial practice. Where the heat losses from the reactor are small or negligible, the relative volume of secondary air can be reduced. Assuming a condition where the calcium sulfate feed is preheated to 1600° F. and the air streams (primary and secondary) are preheated to 1400° F. before introduction into the reactor, and using natural gas as the fuel without preheating, the air flow ratios set out below in Table C are illustrative of desirable commercial practice.

Table C

| Pri. Air Gas | Sec. Air. Pri. Air. | % Total Air Pri. Air | Sec. Air. |
|---|---|---|---|
| 4 | 0.68 | 60 | 40 |
| 5 | 0.34 | 75 | 25 |
| 6 | 0.12 | 90 | 10 |

COAL AS FUEL

The present invention provides a means for maintaining a highly reducing zone in the lower portion of the bed while employing coal as the principal fuel for the reactor. For this purpose, the coal is preferably selected so that it contains sufficient volatiles to form the reducing gas under controlled conditions. When finely-divided coal, such as powdered coal, is introduced into the lower portion of the reactor bed, the volatile combustibles vaporize substantially instantaneously. The result is the formation of a gaseous fuel which can be burned under controlled conditions of limited oxygen to produce a highly reducing gas containing carbon monoxide and hydrogen. For this purpose, the coal preferably contains at least 25% of volatile combustibles on a dry mineral matter free basis. Coals containing less than 18% by weight of volatile combustibles are not suitable for practicing the preferred procedure of the present invention. When the coal contains volatile combustibles in the range of 18 to 25% (dry mineral matter free basis), a reducing gas can be formed under controlled conditions, but the supply of oxygen may need to be limited to such an extent that the primary combustion air may have a lower than optimum volume and velocity for operation of the fluidized bed. Under such conditions, a small proportion of a supplemental fuel providing a combustible gas can be introduced into the lower portion of the bed to supplement the gaseous fuel formed from the volatile combustibles of the coal. More generally, the amount of supplemental fuel can range from 0 to 30% of the heating value of the coal. The amount of such supplemental fuel can be progressively decreased from 30% downwardly, as the amount of volatile combustibles from the coal is increased, particularly in the range above 25% by weight volatiles in the coal. In general, therefore, the process of the present invention utilizes finely-divided coal as a feed to the lower portion of the reactor, the coal containing at least 18% volatiles, and there may also be introduced a supplemental fuel providing volatile combustibles equal to 0 to 30% of the total heating value of the coal as introduced, that is, including the volatiles.

As used herein, the term "heating value" refers to the so-called "higher" or "gross" heating value of a fuel. There are standard procedures for determining gross heating values of each type of fuel, such as coal, fuel gases, and fuel oils. It should be understood that such procedure is to be followed in determining the gross heating value of the supplemental fuel and of the coal, thereby establishing that the amount of supplemental fuel is within the range from 0 to 30% on a gross heating value basis of the total heating value (including volatile combustibles) of the coal. References describing the standard test procedures for gross heating value are: 1974 ANNUAL BOOK OF ASTM STANDARDS, Part 26, for solid fuels, D2015-66, Gross Calorific Value of Solid Fuel by Adiabatic Bomb Calorimeter; for liquid fuels, D240-64 (1973), Heat of Combustion of Liquid Hydrocarbon Fuels by Bomb Calorimeter; and for gaseous fuels, D900, Calorific Value of Gaseous Fuels by Water Flow Calorimeter, or D1826, Calorific Value of Gases in Natural Gas Range by Continuous Recording Calorimeter.

The supplemental fuel may be a fuel gas or a vaporizable fuel oil. Suitable fuel gases, include natural gases, which typically include methane as the major component, or water gas, which is composed principally of carbon monoxide and hydrogen, or a retort coal gas, composed principally of hydrogen and methane. In general, any gaseous fuel can be used, containing as the combustible components hydrocarbon gases, and/or hydrogen, and/or carbon monoxide. The supplemental fuel may also be a hydrocarbon oil, which should be at least partially vaporizable. For example, distilled fuel oils, such as ASTM Nos. 1 and 2 fuel oils, are desirable. The fuel oil need not be completely vaporizable, since at the temperatures of the fluidized bed, any non-vaporizable components will burn or decompose to carbon, which will burn. The vaporizable components of heavier oils, such as residual fuel oils (refinery still bottoms) will therefore function in much the same manner as the coal, providing vaporizable components to supplement the volatiles of the coal, and additional combustible carbon to supplement the non-volatile carbon of the coal. Liquified petroleum gases, such as propane, butane, or mixtures thereof, can also be used.

In an advantageous embodiment, the coal contains at least 25% by weight volatiles, and provides substantially all of the combustible feed to the reactor, there being no need to introduce supplemental fuel. Since fuel oil or gas are generally in shorter supply than coal, it is desired to limit the use of such fuels, as much as possible.

The primary combustion air fed to the lower portion of the reactor (the reducing zone) may also function as the fluidizing air and preferably does so. The primary air may provide from 20 to 70% of the stoichiometric quantity of $O_2$ required for complete combustion of the volatile combustibles of the coal, or if supplemental fuel is used as described above, for complete combustion of the volatile combustibles and the supplemental fuel. Since the solid carbon of the coal burns at a slower rate than the volatiles, such control of the primary air can be utilized to maintain an effective reducing zone in the lower portion of the bed. In certain preferred embodiments, the operation of the reducing zone in the lower portion of the bed is optimized by employing a primary air rate corresponding to 30 to 65% of the stoichiometric quantity of $O_2$ required for complete combustion of the volatile combustibles and any supplemental fuel.

As previously described for other embodiments, secondary air is concurrently supplied to the upper portion of the fluidized bed above the level at which the coal and primary air are introduced. The secondary air provides sufficient oxygen to complete the combustion of the volatile combustibles and the non-volatile combustibles of the coal, as well as the combustion of any supplemental fuel. The secondary air is controlled to provide an effective oxidizing zone above the reducing zone for conversion of CaS to CaO. The optimum volume of secondary air will vary with the operating conditions. For example, it can range from as little as 30% up to as much as 85% of the total air (primary and secondary). As previously pointed out, for optimum thermal and material efficiencies, the total amount of air supplied to the reactor, including the air supplied to both the reducing and oxidizing zones thereof, should be equal to the stoichiometric quantity of air (on an $O_2$ basis) required for complete combustion of the fuel to $CO_2$ and $H_2O$ less the amount of air equivalent ($O_2$) supplied by the decomposition of calcium sulfate. Although some additional air above this optimum value, as indicated above, may be supplied to insure complete combustion of the fuel and to provide a slightly oxidizing off-gas, large excesses of air result in corresponding losses in thermal and material efficiencies. The off-gas can be analyzed periodically or continuously in monitoring the process. Advantageously, the off-gas is substantially free of CO, $H_2$, and unburned fuel, while containing a small percentage of $O_2$ (viz. 0.5 to 2.0 mole %).

The average temperatures to be maintained in the coal-burning fluidized bed can be in accordance with the temperature specified in prior U.S. Pat. Nos. 3,087,790 and 3,607,045, that is, within the range from 2150° to 2250° F. Temperatures above 2250° F. are not desirable. However, as previously indicated, one of the advantages of the process improvement of the present invention is that lower temperatures can be employed than 2150° F. For example, where the use of lower temperatures is desirable, as where the feed has a tendency to sinter at temperatures in the range of 2150° to 2250° F., the temperature can be reduced below 2150° F. Consequently, where a sintering problem is encountered with the feed, it may be desirable to operate at a temperature in the range of about 1950° to 2225° F., but a temperature above 1900° F. is needed. Therefore, in general, the temperature conditions of reactor beds employing the features of the present invention are in the range from 1900° to 2250° F. At such temperatures, the volatile combustibles in the finely-divided coal fed to the lower portions of the reactors vaporize substantially instantaneously as introduced.

Figure 3:
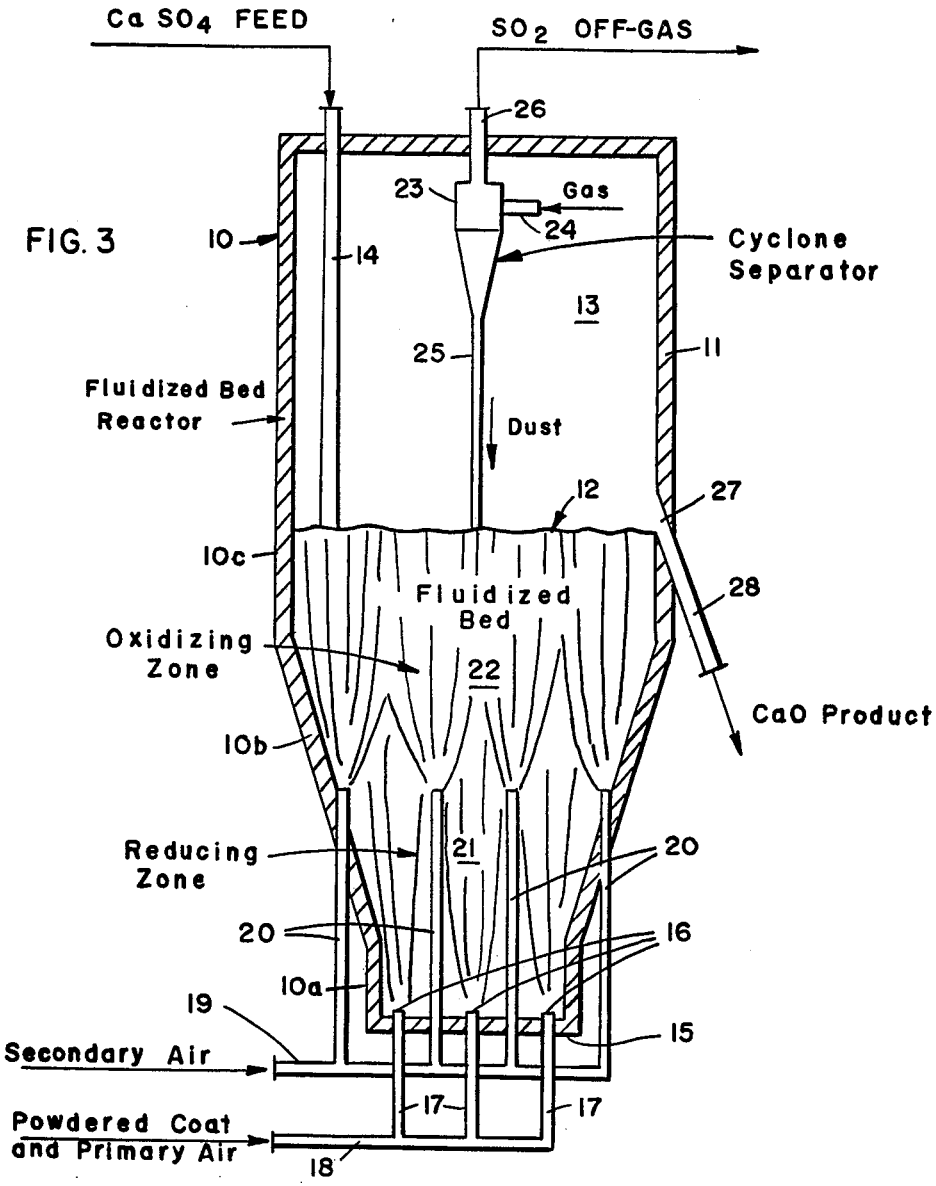

An embodiment of a coal-burning reactor is illustrated by the diagrammatic view of FIG. 3. As there shown, the fluidized bed reactor 10 comprises a vessel having a heat-insulating jacket 11. In the lower portion of the reactor there is provided a fluidized bed designated generally by the number 12 and in the upper portion a gas space 13. As shown, the $CaSO_4$ feed is supplied through the top of the reactor by means of a feed pipe or conduit 14, which extends downwardly to approximately the top of the bed 12. The fluidized bed is illustrated as extending to the bottom of the reactor, the lower horizontally-extending wall 15 of the reactor being provided with a plurality of inlets 16 which connect by conduits 17 to a supply pipe 18. A mixture of powdered coal and primary air is pneumatically conveyed to the inlets 16 through the conduit and pipe system 17, 18. If desired, the inlets 16 may be provided with nozzles to control the injection of the coal-air mixture. It is desirable to achieve a relatively uniform distribution of the fuel across the bottom of the reactor, and to employ relatively high gas velocities in the inlet pipes to avoid backflow of solids from the fluidized bed. Where a supplemental fuel oil or gas is used, the vaporized oil or gas can be mixed with the powdered coal and primary air, and supplied through the same inlet system 17, 18. Separate inlet pipes can also be used for introducing the supplemental fuel into the lower portion of the bed, such as for spraying a fuel oil into the bed.

Additional air, referred to in FIG. 3 as secondary air is also supplied to a portion of the bed located at a higher level than that at which the fuel and primary air are introduced. As shown, the secondary air is introduced through a manifold pipe 19 which communicates with the distributor pipes 20 that extend upwardly to an intermediate level within the fluidized bed 12. A fairly uniform distribution of the secondary air is desirable, and therefore a sufficient number of secondary inlet pipes will be provided to achieve such distribution over the cross-sectional area of the bed at the level of introduction. Means may be utilized in conjunction with the secondary air inlets to minimize backflow of solids, such as turning the upper ends of the secondary inlet pipes downwardly, or using inlet members, such as porous refractories.

With this arrangement, as indicated by the labels on FIG. 3, a reducing zone 21 is provided in the lower portion of the bed, and an oxidizing zone 22 in a portion of the bed above the reducing zone. Strongly reducing conditions can thereby be maintained in the lower portion of bed 12, while oxidizing conditions are maintained in an upper portion thereof. Immediately adjacent to the outlets from pipes 20, a highly oxidizing condition will be present. As the reducing gases flow upwardly from the lower zone 21, and mix with the air introduced through pipes 20, the carbon monoxide and hydrogen, as well as any residual hydrocarbon, will be burned together with the coal solids. The amount of CO and/or $H_2$ in relation to the amount of $O_2$ will therefore gradually reduce in the transition zone between the reducing and oxidizing zones. Thus, an oxidizing zone can be maintained above the reducing zone, while at the same time, the off-gas leaving the top of the bed 12 can be either slightly oxidizing, or essentially neutral. Typically, the off-gas will be composed essentially of $N_2$, $H_2O$, $CO_2$ and $SO_2$, and will contain a small amount of $O_2$, while being essentially free of CO, $H_2$, unburned gaseous fuel, and reduced forms of sulfur (S, $H_2S$, etc.).

Since fine solids (dust) may be entrained in the gas leaving the bed, the gas may be passed through a solids separator, such as a cyclone separator. As shown, a cyclone separator 23 is located within the upper portion of gas space 13. The off-gas enters the separator through a side inlet 24. The separated dust is returned to the fluidized bed through a downwardly extending pipe or conduit 25. The purified gas, containing the recoverable $SO_2$ is removed through a top outlet 26 which extends through the top wall of reactor 10. It will be understood that these features of equipment design may be varied, such as, for example, by locating the cyclone separator outside of the reactor.

Means are also provided for removing the CaO product from the upper portion of bed 12. As shown, a discharge outlet 27 is located on the opposite side of the reactor from the feed inlet 14. The outlet 27 is positioned at the top of the bed 12, and serves to control the upper level of the bed. The lime product is discharged through a pipe or conduit 28 extending downwardly and outwardly from outlet opening 27 through the adjacent side wall of the reactor.

As will be noted with respect to the embodiment of FIG. 3, the walls of the fluidized bed reactor 10 are tapered so that the cross-sectional area of the bed enlarges in an upward direction to allow for the increasing volume of gas flow. More specifically, in the embodiment shown the fuel-primary air inlet area is provided by a section of the reactor 10a having a cylindrical cross-section, which connects with an enlarging frusto-conical section 10b, which in turn connects with an upper cylindrical section 10c. The optimum design and degree of taper will depend on the ratio of secondary air to primary air. However, a perfectly uniform linear gas velocity from top to bottom of the bed is not attainable nor necessary. Up to a two-fold variation in gas velocity can be tolerated under some conditions of operation. However, the more uniform the velocity, the smoother the fluidization and the lower the rate of entrainment of particles in the off-gas. Also, smooth fluidization is conducive to segregation of the lighter, completely reacted particles at the top of the bed where they are skimmed off through the overflow outlet 27, 28. Consequently, it is preferred to employ a reactor in which the upper portion of the fluidized bed (the oxidizing zone) has a greater cross-sectional area than the lower portion thereof (the reducing zone). More specifically, a design in which the cross-sectional area gradually enlarges from the reducing zone to the oxidizing zone is believed to be the most advantageous.

The theoretical amount of stoichiometric air required for combustion of all of the combustibles in any given coal can be calculated (predicted) by the following well-known relationship:

$$\text{(lb. air/lb. coal)} = 11.53 \, C + 34.34 \, \{H_2 - (O_2/8)\} + 4.29 \, S \quad (1)$$

where
$C$ = lb. carbon/lb. coal
$H_2$ = lb. hydrogen/lb. coal
$O_2$ = lb. oxygen/lb. coal
$S$ = lb. sulfur/lb. coal The preceding quantities are determined by the "Ultimate Analysis" of coal, a standard A.S.T.M. method. See *Steam, Its Generation and Use,* The Babcock & Wilcox Co., New York, 1955; and/or Fryling, G. R., *Combustion Engineering,* Combustion Engineering, Inc., New York, 1966.

The above formula is based on the stoichiometry of the following combustion reactions:

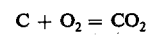

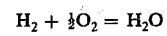

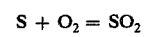

The volatile matter content and fixed carbon content of any given coal is given by the "Proximate Analysis" which is another standard A.S.T.M. method. (See publications cited for "Ultimate Analysis"). The term "volatile combustibles" of coal as used herein therefore refers to this standard method. These two quantities are determined essentially by pyrolysis of a coal sample under specified temperature conditions. The stoichiometric amount of air required for combustion of the fixed carbon is given by the relation $$\text{(lb. air/lb. coal)} = 11.53 \, C_{fc} \quad (2)$$

The difference between this quantity and the quantity given by the previous relation is substantially the stoichiometric quantity of air required for combustion of the volatile matter. In other words, by substracting equation (2) from equation (1), there is obtained the following relationship which predicts the theoretical stoichiometric amount of air needed for combustion of the volatile matter:

$$\text{(lb. air/lb. coal)} = 11.53 \, (C - C_{fc}) + 34.34 \, [H_2 - (O_2/8)] + 4.29 \, S \quad (3)$$

It will be understood that the A.S.T.M. method of "Proximate Analysis" does not predict the exact amount of volatile combustibles which will be released from the coal in the fluidized bed. Because of the very rapid heating of the powdered coal as introduced into the bed, a little more volatile matter may be released than is indicated by the standard A.S.T.M. method of analysis. However, the "Proximate Analysis" method provides a sufficiently accurate approximation for the purposes of the present invention.

The range of different coals which may be used in practicing the present invention is illustrated by the coals specified below in Table A. As will be noted, with the Pittsburgh, Illinois No. 2, and Monarch coals, the volatile matter (volatile combustibles) comprises from 30 to 40% of the coals. Such coals are therefore preferred for practicing the present invention. On the other hand, Pocahontas No. 3, contains only 18.2% volatile matter. This coal is therefore at the lower limit of the coals containing sufficient volatile combustibles for use in practicing the present invention. If Pocahontas No. 3 is employed, therefore, it will be desirable under some conditions to supplement the volatile combustibles of the coal with fuel oil or gas. For high oxygen content coals such as Monarch, at some preheat temperature, it may be desirable to substitute fuel oil or gas for a minor portion of the coal in order to increase the flow of fluidizing gas (air + fuel vapor).

gen supplied by the decomposition of calcium sulfate as per the equation $$CaSO_4 = CaO + SO_2 + \tfrac{1}{2}O_2.$$

In other words for maximum efficiency, the amount of primary air should equal the difference between 3.70 lb. air/lb. coal and the amount of air equivalent to that supplied by the preceding reaction. Thus for this case complete decomposition of the calcium sulfate would yield the equivalent of 1.73 lb. air/lb. coal and the difference between 3.70 and 1.73 or 1.97 lb. air/lb. coal would be the optimum amount of primary air. This quantity of primary air would correspond to 53% of the

TABLE D
COAL COMPOSITIONS AND HEATING VALUES*

Proximate Analysis, % By Wt.

|  | Pocahontas No. 3 | Pittsburgh | Illinois No. 2 | Monarch |
|---|---|---|---|---|
| $H_2O$ | 3.6 | 2.6 | 12.1 | 23.2 |
| Volatile matter | 18.2 | 30.0 | 40.2 | 33.3 |
| Fixed carbon | 74.4 | 58.3 | 39.1 | 39.7 |
| Ash | 3.9 | 9.1 | 8.6 | 3.8 |
|  | 100.0 | 100.0 | 100.0 | 100.0 |

Ultimate Analysis, % By Wt.

|  | Pocahontas No. 3 | Pittsburgh | Illinois No. 2 | Monarch |
|---|---|---|---|---|
| Carbon | 84.0 | 76.6 | 62.8 | 54.6 |
| Hydrogen | 4.8 | 5.2 | 5.9 | 6.4 |
| Oxygen | 5.6 | 6.2 | 17.4 | 33.8 |
| Sulfur | 0.6 | 1.3 | 4.3 | 0.4 |
| Nitrogen | 1.1 | 1.6 | 1.0 | 1.0 |
| Ash | 3.9 | 9.1 | 8.6 | 3.8 |
|  | 100.0 | 100.0 | 100.0 | 100.0 |

Heating Value

|  | Pocahontas No. | Pittsburgh | Illinois No. 2 | Monarch |
|---|---|---|---|---|
| Gross, Btu/lb. | 14,500 | 13,610 | 11.480 | 9.420 |
| Lower, Btu/lb. | 14,101 | 13,124 | 10.928 | 8,821 |

A.S.T.M. Classification

| Pocahontas No. 3 | Low volatile bituminous |
| Pittsburgh | High volatile A bituminous |
| Illinois No. 2 | High volatile C bituminous |
| Monarch | Subbituminous B |

*Data from "Chemical Engineers Handbook," K.J. Perry, ed., 3rd edition, p. 1561, McGraw-Hill, N.Y., 1950.

EXAMPLE VI

Pittsburgh seam coal is used together with air to supply the necessary reductants and overall heat of reaction. The typical composition and heating value of this coal is given above in Table D. Assuming that the fluidized bed reactor is operated at 2200° F. and that the calcium sulfate feed, air, and powdered coal are all introduced at ambient temperature (77° F.) into the reactor and that heat losses from the reactor are negligible, it is possible to estimate by means of material and energy balance calculations that 0.29 lb. coal/lb. $CaSO_4$ decomposed will be required for conduct of the process under optimal conditions. Application of the preceding formulas yield the following stoichiometric quantities of air:

|  | lb. air/lb. coal |
|---|---|
| For complete combustion of coal | 10.42 |
| For combustion of fixed carbon | 6.72 |
| For combustion of volatile matter | 3.70 |

Hence, the application of the process described herein, the amount of primary air introduced with the powdered coal into the bottom of the fluidized bed reactor should be substantially less than 3.70 lb./lb. coal. In fact for maximum thermal efficiency, it should be less than this amount by the amount of air equivalent to the oxystoichiometric amount of air required for complete combustion of the volatile matter. Furthermore for maximum thermal efficiency the amount of secondary air should just equal the stoichiometric quantity of air required for combustion of the fixed carbon or 6.72 lb. air/lb. coal. However, in order to insure sufficiently oxidizing conditions in the upper part of the fluidized bed for proper application of this process, the actual amount of secondary air should be somewhat greater than the stoichiometric amount. Although the excess quantity of secondary air is not critical, it can range from about 1 to 10% of the stoichiometric air required for combustion of the fixed carbon or in other words for the present case the amount of secondary air can range from about 6.8 to 7.4 lb./lb. coal.

In carrying out this process it is advantageous to recover sensible heat from the reaction products as by the methods described in U.S. Pat. No. 3,607,045 and use this heat to preheat the calcium sulfate feed and air supplied to the reactor. This modification will improve the overall thermal efficiency of the process and reduce both the amounts of coal and air required. Thus if sufficient heat were recovered to increase the temperature of the calcium sulfate feed to 1600° F. and all of the air fed to 600° F., the amount of Pittsburgh seam coal needed would be 0.19 lb./lb. $CaSO_4$ decomposed which is about one-third less than would be required with no heat recovery. With this much heat recovery, the amount of primary air would be 1.1 lb./lb. coal or 30% of the stoichiometric amount of air required for combustion of the volatile matter. The amount of secondary air per unit of coal burned would be the same as with no heat recovery since it is determined by the fixed carbon content of the coal. If the calcium sulfate and air were preheaated by other means to the same temperatures, the results would be the same. Alternate means of preheating the calcium sulfate could arise as in the application of this process to the decomposition of sulfated lime which is produced by combustion of coal in a fluidized bed boiler as described in U.S. Pat. Nos. 3,717,700 and 3,763,830.

EXAMPLE VII

To further illustrate the application of this invention, the quantities of coal, primary air, and secondary air were determined by means of the principles described above for several types of bituminous and subbituminous coal and for various degrees of feed preheat. These quantities are presented in Table E.

TABLE E

| Coal Seam | Preheat Temp., °F. $CaSO_4$ | Preheat Temp., °F. Air | lb. Coal lb. $CaSO_4$ | lb. Air/lb. Coal Pri. | lb. Air/lb. Coal Sec. | lb. Air/lb. Coal Total |
|---|---|---|---|---|---|---|
| Pittsburgh | 77 | 77 | 0.29 | 2.0 | 6.7 | 8.7 |
| Pittsburgh | 1600 | 600 | 0.19 | 1.1 | 6.7 | 7.8 |
| Ill. No. 2 | 77 | 77 | 0.35 | 2.8 | 4.5 | 7.3 |
| Ill. No. 2 | 1600 | 600 | 0.23 | 2.0 | 4.5 | 6.5 |
| Monarch | 77 | 77 | 0.44 | 1.3 | 4.6 | 5.9 |
| Monarch | 1600 | 600 | 0.29 | 0.7 | 4.6 | 5.3 |

For illustrative purposes it was assumed that all of the air would be preheated to the temperatures indicated. In actual application, it may be necessary to restrict preheating of the primary air to temperatures somewhat less than 600° F. to avoid ignition of the powdered coal transported by the primary air. However, there would be no such temperature limitation for the secondary air, and since the secondary air constitutes a major portion of the total air supplied, the results would not be too different if only the secondary air were preheated to the indicated temperatures. The stoichiometric amount of air required for combustion of the volatile matter in the various types of coal is listed below.

| Coal | lb. air/lb. coal |
|---|---|
| Pittsburgh | 3.70 |
| Illinois No. 2 | 4.20 |
| Monarch | 2.48 |

Whereas both the Pittsburgh and Illinois No. 2 coals require large amounts of air for combustion of volatile matter, the Monarch coal requires a smaller amount. This smaller air requirement is characteristic of a highly-oxygenated coal such as Monarch. Hence, much less primary air is needed with the Monarch coal than with the Pittsburgh and Illinois No. 2 coals. Consequently under conditions of high temperature preheat, the quantity of primary air needed may be too small for effective fluidization. This difficulty can be resolved by employing a mixture of coal and some gaseous or vaporized hydrocarbon fuel.

EXAMPLE VIII

In another application of this process similar to that described in the previous example, except that Pocahontas No. 3 coal (see Table D) is mixed with natural gas (assumed 100% $CH_4$) to make up for the low volatile matter content of the coal, the calcium sulfate feed is preheated to 1600° F. and air to 600° F. If Pocahontas No. 3 coal were the only fuel used in this case, only 0.18 lb. coal/lb. $CaSO_4$ decomposed would be needed and the air equivalent to the oxygen supplied by the decomposition of calcium sulfate (2.79 lb./lb. coal) would exceed the stoichiometric amount of air required for combustion of the volatile matter (2.54 lb./lb. coal). On the other hand, if part of the fuel requirement of the process is supplied by natural gas, operable conditions can readily be established. For example, by using sufficient natural gas to supply 20% of the fuel requirement, the primary air requirement would attain a practical level. For this condition 0.146 lb. coal/lb. $CaSO_4$ and 0.024 lb. $CH_4$/lb. $CaSO_4$ would be needed and the primary air required would be 1.88 lb./lb. coal which would correspond to 35% of the stoichiometric amount of air required to burn both the coal volatile matter and natural gas. The quantity of secondary air would again correspond to the stoichiometric amount of air required to complete the combustion of all the fuel and to provide an effective oxidizing zone in the upper portion of the bed, allowing for oxygen liberated in the decomposition of $CaSO_4$. Under the stated conditions, for combustion of the fixed carbon (8.6 lb./lb. coal) plus a small excess (1 to 10%) to insure oxidizing conditions in the upper part of the fluidized bed, the secondary air could range from about 8.7 to 9.5 lb./lb. coal.

In the foregoing example, the computations were made on the basis of a theoretical natural gas containing 100% methane. However, the computed values would not differ very much for commercial natural gases, such as Texarkana natural gas, which typically contains about 96% $CH_4$, and has a corresponding gross heating value of 967 btu/cu.ft.

EXAMPLE IX

In another application of this process similar to that described in Example VIII, except that water gas (assumed 50 mole % $H_2$, 50 mole % CO) is used in place of natural gas to make up for the low volatile matter content of the coal, sufficient water gas is furnished to supply 20% of the fuel requirement and sufficient Pocahontas No. 3 coal to supply 80%. The calcium sulfate feed is preheated to 1600° F. and air to 600° F. and heat losses from the reactor are negligible as before. For this condition 0.146 lb. coal/lb. $CaSO_4$ and 0.068 lb. water gas/lb. $CaSO_4$ would be needed and the primary air required would be 1.21 lb./lb. coal which would correspond to 26% of the stoichiometric amount of air required to burn both the coal volatile matter and water gas. The quantity of secondary air on the same basis as in Example III, for combustion of the fixed carbon (8.6 lb./lb. coal) plus a small excess (1 to 10%) to insure oxidizing conditions in the upper part of the fluidized bed could range from about 8.7 to 9.5 lb./lb. coal.

The foregoing computation was based on theoretical water gas (50% $H_2$, 50% CO). However, the values would not be affected very much with respect to a commercial water gas, such as Blue Water Gas, which typically contains about 43% carbon monoxide and 50% hydrogen, and has a corresponding gross heating value of about 308 btu/cu.ft. Similar computations can be made where the supplemental fuel gas contains a mixture of hydrocarbon gas, carbon monoxide, and hydrogen, such as a retort coal gas, which typically may contain 8.6 mole % CO, 52.5% $H_2$, and 31.4%

$CH_4$, and has a corresponding gross heating value of about 575 btu/cu.ft.

EXAMPLE X

In another application of this process similar to that described in Example VIII, except that No. 2 fuel oil is used in place of natural gas to make up for the low volatile matter content of the coal, sufficient fuel oil is furnished to supply 20% of the fuel requirement and sufficient Pocahontas No. 3 coal to supply 80%. The calcium sulfate feed is preheated to 1600° F. and air to 600° F. and heat losses from the reactor are negligible as before. For this condition 0.146 lb. coal/lb. $CaSO_4$ and 0.028 lb. oil/lb. $CaSO_4$ would be needed and the primary air required would be 1.80 lb./lb. coal which would correspond to 34% of the stoichiometric amount of air required to burn both the coal volatile matter and fuel oil. The quantity of secondary air on the same basis as in Example VIII, for combustion of the fixed carbon (8.6 lb./lb. coal) plus a small excess (1 to 10%) to insure oxidizing conditions in the upper part of the fluidized bed could range from about 8.7 to 9.5 lb./lb. coal.

No. 2 fuel oil has a typical analysis of 86.4 weight % carbon and 12.7% hydrogen, and a corresponding gross heating value of about 19,570 btu/lb.

It will be understood that the extent of conversion of $CaSO_4$ to CaO will be related to the length of the average residence time in the fluidized bed. For some purposes, high conversions may be desirable, as illustrated by certain of the foregoing examples. In other applications, lower conversions will be commercially acceptable. For example, where the process is used to treat sulfated lime produced in fluidized bed combustion systems, it may be more economical to employ a shorter residence time with a resulting smaller conversion. A small amount of residual $CaSO_4$ left in the product will not interfere with the use of the regenerated CaO for adsorbing more $SO_2$ in the fluidized bed converter.

I claim:

1. The continuous process of converting $CaSO_4$ to a solid CaO product and a gaseous $SO_2$ product by high temperature treatment of finely-divided $CaSO_4$ in a circulating fluidized bed of solid particles into which is introduced a hydrogen-containing carbonaceous fuel and air for combustion thereof to form in said bed a reducing gas containing CO and $H_2$, wherein the improvement comprises: maintaining a reducing zone in a lower portion of said fluidized bed by introducing a feed to said reducing zone portion consisting essentially of said hydrogen-containing carbonaceous fuel and primary air, controlling the quantity of said primary air so that the reducing conditions in said lower reducing zone portion are effective to convert said $CaSO_4$ therein to a mixture of CaO and CaS, concurrently introducing secondary air into an upper portion of said bed above the level at which said fuel is introduced to provide an oxidizing zone within said bed capable of converting CaS to CaO, the solid particles of said bed during said treatment continuously circulating between and through said reducing and oxidizing zones, the total amount of $O_2$ supplied in said primary and secondary air plus the $O_2$ produced by calcium sulfate decomposition being at least equal to the stoichiometric quantity of $O_2$ required for complete combustion of the said fuel to $CO_2$ and $H_2O$, removing the CaO product from the upper portion of said bed, and removing the gaseous $SO_2$ product from above the bed substantially free of CO, $H_2$ and said fuel.

2. The continuous process of converting $CaSO_4$ to a solid CaO product and a gaseous $SO_2$ product by high temperature treatment of finely-divided $CaSO_4$ in a circulating fluidized bed of solid particles into which is introduced a hydrogen-containing carbonaceous fuel and air for combustion thereof to form in said bed a reducing gas containing CO and $H_2$, wherein the improvement comprises: maintaining a reducing zone in a lower portion of said fluidized bed by introducing a feed to said reducing zone portion consisting essentially of gaseous or liquid hydrocarbon fuel and primary air, controlling the quantity of said primary air so that the reducing conditions in said lower reducing zone portion are effective to convert said $CaSO_4$ therein to a mixture of CaO and CaS, concurrently introducing secondary air into an upper portion of said bed above the level at which said fuel is introduced to provide an oxidizing zone within said bed capable of converting CaS to CaO, the solid particles of said bed during treatment continuously circulating between and through said reducing and oxidizing zones, the total amount of $O_2$ supplied in said primary and secondary air plus the $O_2$ produced by calcium sulfate decomposition being at least equal to the stoichiometric quantity of $O_2$ required for complete combustion of the said fuel to $CO_2$ and $H_2O$, removing the CaO product from the upper portion of said bed, and removing the gaseous $SO_2$ product from above the bed substantially free of CO, $H_2$ and said fuel.

3. The process of claim 2 in which said primary air provides from 20 to 90% of the stoichiometric quantity of $O_2$ required for complete combustion of said fuel to $CO_2$ and $H_2O$, and said secondary air comprises from 10 to 60% of the total air introduced into said fluidized bed.

4. The process of claim 2 wherein the improvement is further characterized by the fact that the upper portion of said fluidized bed has a greater cross-sectional area than the lower portion thereof.

5. The continuous process of producing a solid CaO product and a gaseous $SO_2$ product by high temperature treatment of finely-divided $CaSO_4$ in a circulating fluidized bed of solid particles into which is introduced a gaseous or liquid hydrocarbon fuel and air for combustion thereof to form in said bed a reducing gas containing CO and $H_2$, wherein the improvement comprises: maintaining a strongly reducing zone in the lower portion of said fluidized bed by introducing a feed to said reducing zone portion consisting of said fuel and primary air, said primary air providing from 40 to 65% of the stoichiometric quantity of $O_2$ required for complete combustion of said fuel to $CO_2$ and $H_2O$ and said primary air being distributed across the bottom of said bed for effective fluidization thereof, a mixture of CaO and CaS being produced in said reducing zone portion, and concurrently introducing secondary air into an upper portion of said bed above the level at which said fuel is introduced to provide an oxidizing zone within said bed above said reducing zone capable of converting CaS to CaO, said secondary air providing from 15 to 40% of the total air introduced into the fluidized bed, the solid particles of said bed during said treatment continuously circulating between and through said reducing and oxidizing zones, the total amount of $O_2$ being supplied in said primary and secondary air plus the $O_2$ produced by the calcium sulfate decomposition being at least equal to the stoichiometric quantity of $O_2$ required for complete combustion of said fuel to $CO_2$ and $H_2O$ removing a CaO product from the uppermost portion of said bed beneath which said secondary air is fed to said oxidizing zone, and removing the gaseous SO$_2$ product from above the bed substantially free of CO, H$_2$, and said fuel.

6. The process of claim 5 wherein the improvement is further characterized by the fact that the upper portion of said fluidized bed has a greater cross-sectional area than the lower portion thereof.

7. The continuous process of producing a solid CaO product and a gaseous SO$_2$ product by high temperature treatment of finely-divided CaSO$_4$ in a circulating fluidized bed of solid particles into which is introduced a gaseous or liquid hydrocarbon fuel and air for combustion thereof to form in said bed a reducing gas containing CO and H$_2$, wherein the improvement comprises maintaining a strongly reducing zone in the lower portion consisting essentially of a gaseous or liquid hydrocarbon fuel and primary air providing from 30 to 70% of the stoichiometric quantity of O$_2$ required for complete combustion of said fuel to CO$_2$ and H$_2$O, a mixture of CaO and CaS being produced in said reducing zone portion, the upper portion of said fluidized bed having a greater cross-sectional area than said lower portion thereof, concurrently introducing secondary air into the upper portion of said bed above the level at which said fuel is introduced to provide an oxidizing zone within said bed capable of converting CaS to CaO, the solid particles of said bed during said treatment continuously circulating between and through said reducing and oxidizing zones, said secondary air comprising from 15 to 40% of the total air introduced into said fluidized bed, the total amount of O$_2$ supplied in said primary and secondary air plus the O$_2$ produced by calcium sulfate decomposition being at least equal to the stoichiometric quantity of O$_2$ required for complete combustion of said fuel to CO$_2$ and H$_2$O, removing a CaO product substantially free of CaS from the upper portion of said bed at a level above the level at which said secondary air is fed to said oxidizing zone, and removing the gaseous SO$_2$ product from above said bed substantially free of CO, H$_2$, and said fuel.

8. The process of claim 7 in which the calcium sulfate feed material supplied to said fluidized bed is subject to sintering at temperatures in the range of 2150° to 2250° F., and said improvement is further characterized by said bed during said treatment being maintained at a temperature of from about 1950° to 2125° F.

* * * * *